July 7, 1953 — P. W. ZBOCK ET AL — 2,644,656
PARACHUTE, INCLUDING A REGULATED AIR PASSAGE
Filed June 18, 1951 — 4 Sheets-Sheet 1

Peter W. Zbock
Frank Zbock
INVENTORS.

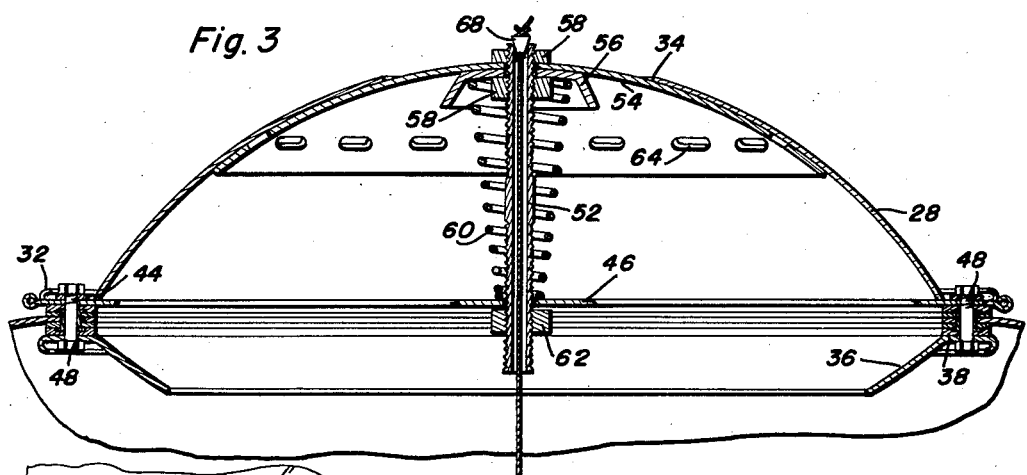
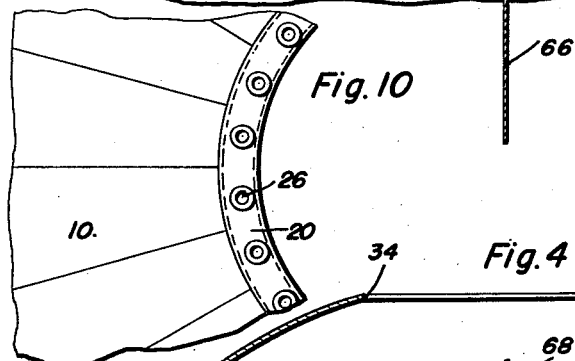
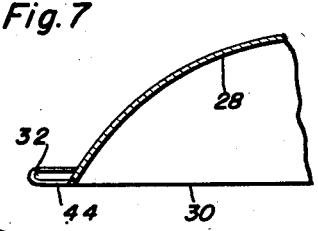
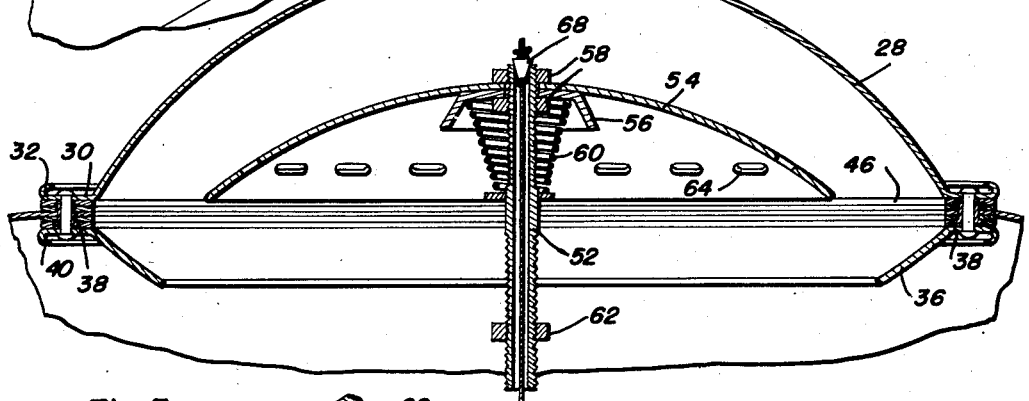
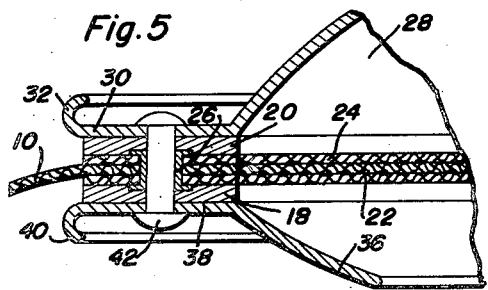
Peter W. Zbock
Frank Zbock
INVENTORS.

July 7, 1953  P. W. ZBOCK ET AL  2,644,656
PARACHUTE, INCLUDING A REGULATED AIR PASSAGE
Filed June 18, 1951  4 Sheets-Sheet 3
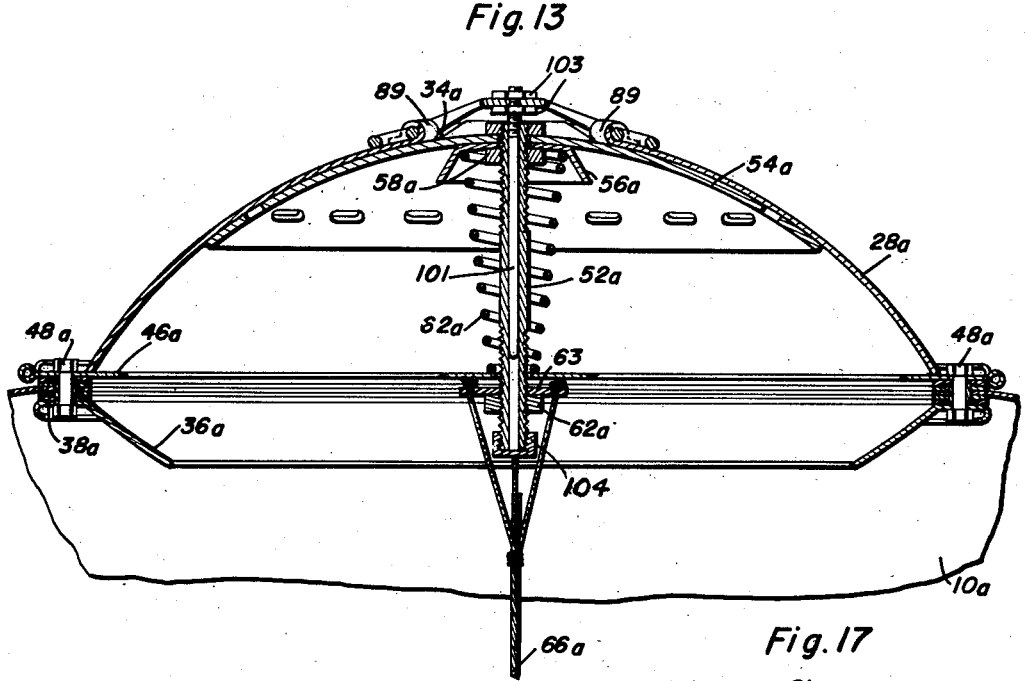
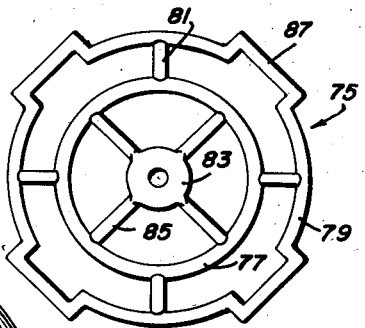
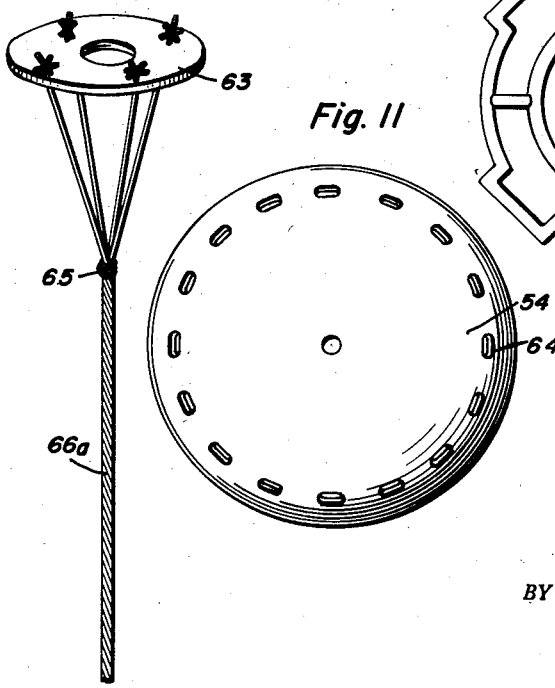
Peter W. Zbock
Frank Zbock
INVENTORS.

July 7, 1953 P. W. ZBOCK ET AL 2,644,656
PARACHUTE, INCLUDING A REGULATED AIR PASSAGE
Filed June 18, 1951 4 Sheets-Sheet 4

Peter W. Zbock
Frank Zbock
INVENTORS.

Patented July 7, 1953

2,644,656

UNITED STATES PATENT OFFICE 2,644,656

PARACHUTE, INCLUDING A REGULATED AIR PASSAGE

Peter W. Zbock and Frank Zbock, Bellaire, Ohio

Application June 18, 1951, Serial No. 232,078

9 Claims. (Cl. 244—152)

This invention relates to new and useful improvements in parachutes and the primary object of the present invention is to provide a parachute whereby a user may quickly and readily control and vary the speed of descent in a convenient manner.

Another important object of the present invention is to provide a parachute including a canopy having an opening therein in which a centrally apertured dome is mounted together with a novel and improved manually actuated valve for selectively opening and closing the aperture in the dome.

A further object of the present invention is the provision of an improved support and guide for the valve and a reinforcing and strengthening means for the dome.

A still further aim of the present invention is to provide a parachute that is extremely simple and practical in construction whereby the same may be folded into a small article when not in use, and one that is inexpensive to manufacture and service.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged vertical sectional view taken substantially on the plane of section line 3—3 of Figure 2 and showing the opening in the outer dome closed by the inner dome;

Figure 4 is an enlarged vertical sectional view taken on the plane of section line 4—4 of Figure 2 but showing the inner dome moved away from the outer dome to expose the opening in the outer dome;

Figure 5 is an enlarged fragmentary view of Figure 4 to illustrate the reinforced opening in the canopy;

Figure 7 is a sectional view taken substantially on the plane of section line 7—7 of Figure 6;

Figure 10 is a fragmentary plan view of the canopy showing the manner in which the opening therein is reinforced;

Figure 11 is a plan view of the inner dome;

Figure 13 is an enlarged vertical sectional view taken substantially on the plane of section line 13—13 of Figure 12;

Figure 17 is a plan view of the guide cage per se used with the parachute of Figures 12–16; and, Figure 18 is a perspective view of the actuating cord and the attaching disk therefor that is used with the parachute of Figures 12–16.

Figure 1:
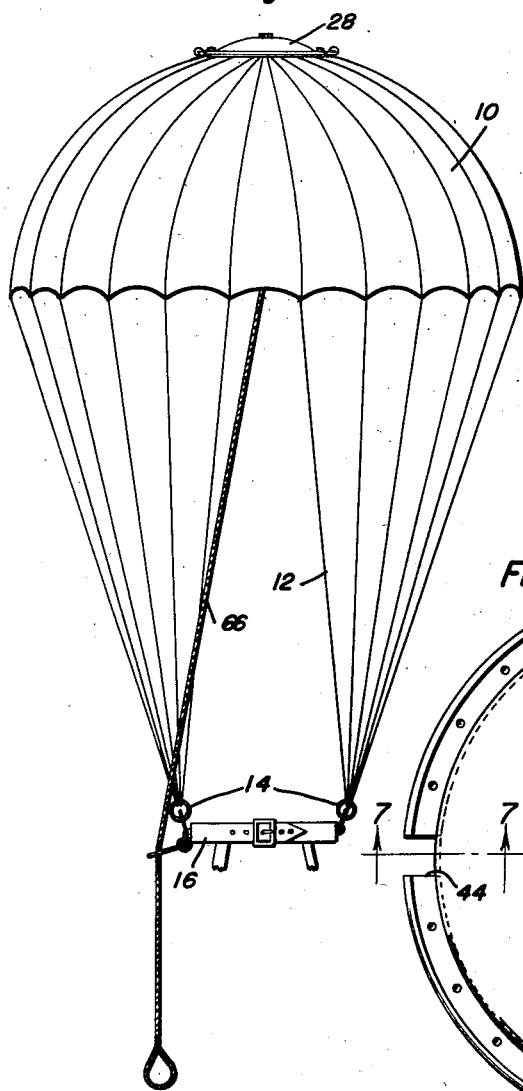
Figure 1 is a side elevational view of the present invention.

Referring now to the drawings in detail, wherein for the purpose of illustration, there is disclosed a preferred embodiment of the present invention, the numeral 10 represents a canopy having downwardly extending and converging shrouds 12 whose lower ends are attached to rings 14 on a harness or belt 16.

The canopy 10 is formed with a central opening whose edge is reinforced and strengthened by inner and outer rings of canvas 18 and 20, and inner and outer rings of nylon 22 and 24, arranged as shown best in Figure 5. The rings 22 and 24 are connected together and to the canopy 10 by grommets 26.

An outer dome 28 rises from the canopy 10 and includes a peripheral flat flange 30 whose outer edge is rolled upwardly as at 32. The dome 28 is provided with a central opening 34 of a diameter considerably smaller than the opening in the canopy through which air may pass as the parachute is used.

A rim 36 extends radially downwardly and inwardly from the flange 30 and includes an upper peripheral flanged portion 38 whose outer edge is rolled outwardly as at 40. The flange 30 overlies the rings 18, 20, 22 and 24 whereas the flanged portion 38 underlies the rings 18, 20, 22 and 24, and the flange 30 is secured to the flanged portion 38 by fasteners 42 that extend through the grommets 26, the rings 18 and 22, the flange 30 and the flanged portion 38.

The flange 30 is formed with a pair of diametrically opposed slots 44 that receive the ends of a diametrically disposed support or strap 46. The ends of the strap 46 are apertured to receive fasteners 48 that extend through the flanged portion 38, the rings 18, 20, 22 and 24 and the canopy 10.

Strap 46 is formed with a central aperture 50 that slidably receives a tubular rod 52 whose upper threaded end extends through registering apertures centrally formed in an inner dome 54 and a cap 46. Nuts 58 threaded on the upper end of the rod force the cap 56 against the inner dome 54.

A conical coil spring 60 embraces the rod 52 and its major end is positioned in the cap 56 and its minor end rests against the strap 46 to yieldingly urge the inner dome 54 against the outer dome 28 and the inner dome to a position for closing opening 34.

The lower end of the rod 52 is threaded to receivably engage an abutment 62 that may be manually adjusted to limit upward movement of the inner dome relative to the outer dome. The inner dome is formed with a plurality of circumferentially spaced apertures 64 through which air may pass when the inner dome is lowered relative to the outer dome.

An operating cord 66 extends upwardly through the rod 52 and its upper end is attached to a wedge 68 that is fitted in the upper end of the rod 52.

Figure 12:
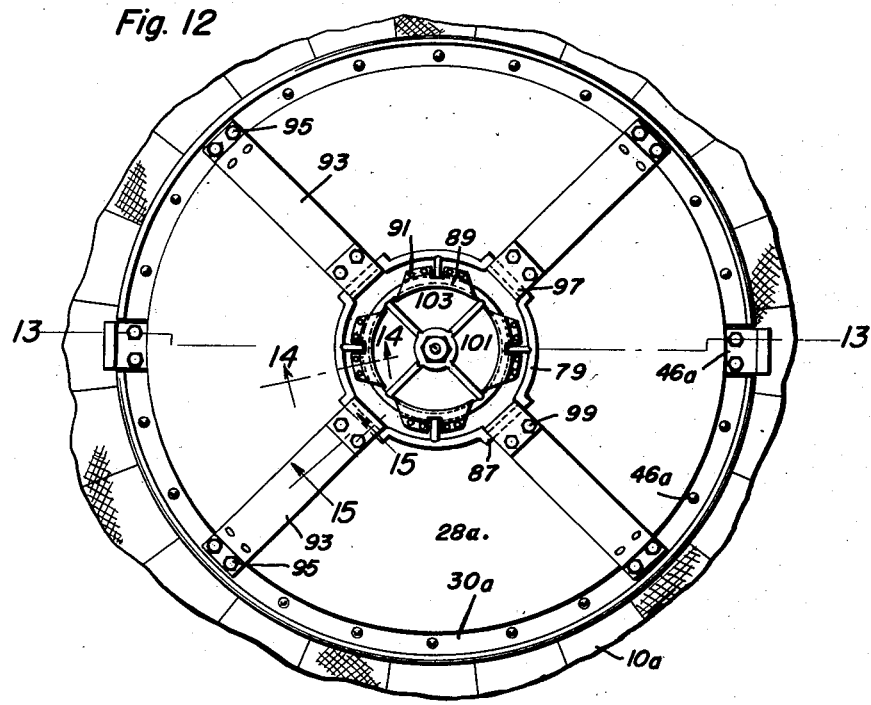
Figure 12 is a fragmentary plan view of the present invention in modified form.
Figure 14:
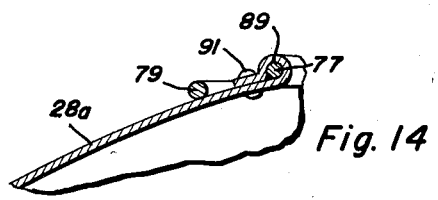
Figure 14 is an enlarged vertical sectional view taken substantially on the plane of section line 14—14 of Figure 12.
Figure 15:
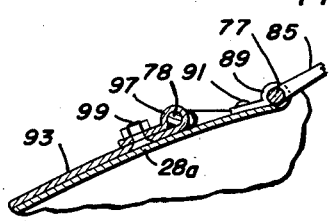
Figure 15 is an enlarged vertical sectional view taken substantially on the plane of section line 15—15 of Figure 12.
Figure 16:
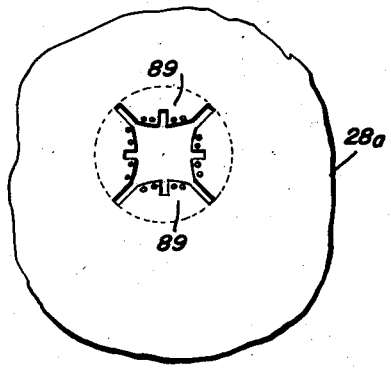
Figure 16 is a fragmentary plan view of the dome prior to the bending thereof to form holding tongues for the guide cage.

Figures 12–18 inclusive illustrate the present invention in slightly modified form. In this embodiment, the flange portion 38a of the rim 36a is secured to the flange 30a of the outer dome 28a and to the reinforced edges of the opening in canopy 10a by fasteners 42a.

The ends of a diametrically disposed strap or support 46a are disposed in a pair of diametrically opposed notches in the flange 30a and the ends of strap 46a are secured to the rings reinforcing the opening in the canopy and to flanged portion 38a by fasteners 48a.

A tubular rod 52a is slidably received in a central aperture in the strap 46a and the lower end of rod 52a carries an abutment 62a upon which there is supported a disk 63. The strands of an operating cord 66a are held in apertures in the disk 63 by knotting the upper ends of the strands. The strands are held against unravelling by a binding 65. A wire cage 75 is mounted on the outer periphery of the dome 28a and includes inner and outer concentric wire rings 77 and 79 that are connected by radial lugs 81. A centrally apertured plate 83 is supported within the ring 77 by radial arms 85 terminally fixed to the ring 77 and plate 83. The ring 79 is formed with a plurality of circumferentially spaced radial depressions 87.

The opening 34a in the outer dome 28a is so formed to include tongues 89 that are bent back about the inner ring 77 and which are secured to themselves by fasteners 91.

Attaching straps 93 are disposed against the upper surface of the dame 28a and then lower ends are anchored to the flange 30a and the flanged portion 38a by fasteners 95. The upper ends of the straps are bent upon themselves to form loops 97 that embrace the depressions 87 and the loops 97 are secured to themselves by fasteners 99.

The upper end of a rod or bar 101 is secured to the ring 83 by upper and lower nuts 103 and the rod 101 is slidably received in the rod 52a to guide movement of the inner dome 54a toward and away from the outer dome 28a. The upper end of rod 52a is secured to the dome 54a and to a cap 56a by nuts 58a and the conical spring 62a embraces rod 52. The major end of spring 62a is seated in cap 58a whereas the minor end of spring 62 rests against the support 46a.

Figure 2:
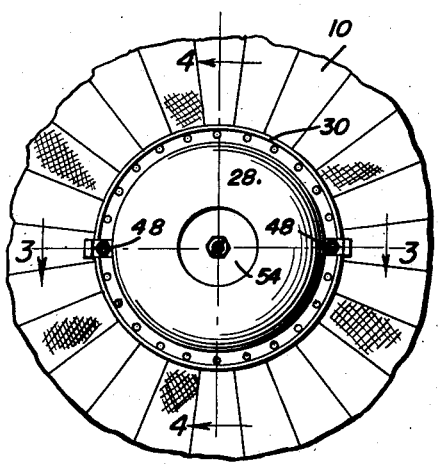
Figure 2 is an enlarged fragmentary top plan view of Figure 1.
Figure 6:
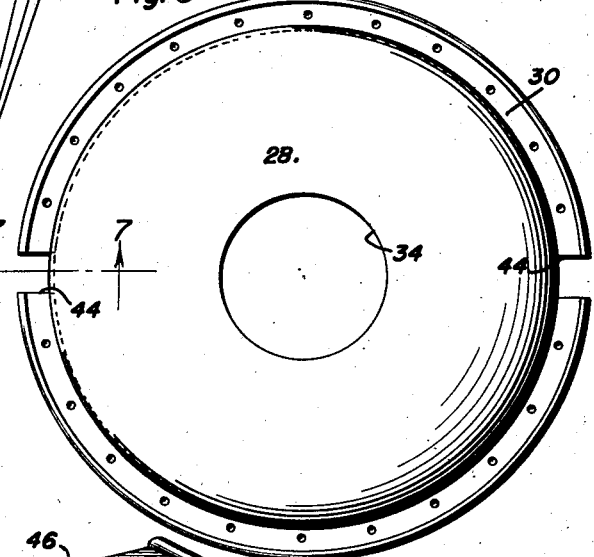
Figure 6 is a plan view of the outer dome shown in Figures 3 and 4.
Figure 9:
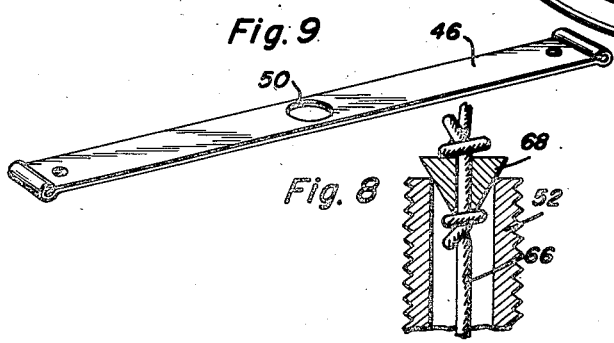
Figure 9 is a perspective view of the support and guide for the inner dome holding rod.
Figure 8:
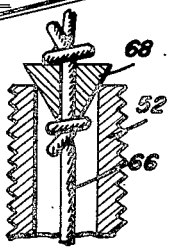
Figure 8 is an enlarged detail vertical sectional view showing the manner in which the inner dome actuating cord is attached to its supporting rod.

It will thus be seen that the device described in Figures 12–18 inclusive is similar to the device of Figures 1–11 inclusive with the exception as to the support and guide for the inner dome holding rod and the structure for attaching the inner dome supporting rod to the actuating cord.

In practical use of the invention, the rim 36 or 36a will block the lower end of the outer dome 28 or 28a and the rim will also reinforce and strengthen the structure.

As the jumper pulls the operating cord 66 or 66a the dome 54 or 54a will move downwardly from the dome 28 or 28a so that air may pass through the opening in the outer dome, thereby permitting the jumper to control and vary his descent.

The apertures 64 of Figure 3 are very important inasmuch as they will permit easing of the tremendous air pressure before member 54 is half or fully opened.

A closure cap 104 is threaded on the lower end of tube 52a to prevent air from passing upwardly through tube 52a when the invention is being used.

Having described the invention, what is claimed as new is:

1. A parachute comprising a canopy having a central opening therein, a downwardly facing outer dome having a marginal flange secured to the canopy about the opening, said dome including a central opening, a downwardly facing inner rigid, perforated dome axially slidably received within the outer dome for selectively opening and closing the opening in said outer dome, means urging the convex surface of the inner dome against the concave surface of the outer dome and to a position for closing the opening in the outer dome, and an actuating cord attached to said inner dome for moving the inner dome away from the outer dome.

2. A parachute comprising a canopy having a central opening therein, downwardly facing outer dome having a marginal flange secured to the canopy about the opening, said dome including a central opening, a downwardly facing inner perforated dome axially slidably received within the outer dome and considerably larger than said opening for selectively covering and uncovering the opening in said outer dome, a diametrical support extending across the outer dome and having ends secured to said flange, a rod slidably supported by said support and secured to the center of said inner dome, spring means between the support and the inner dome urging the upper convex surface of the inner dome against the lower concave surface of the outer dome and to a position closing the opening in the outer dome, and a cord attached to said rod for sliding the same against action of said spring.

3. The combination of claim 2 and a cap mounted on said rod and underlying and secured against the concave surface of the inner dome, said spring being conical and surrounding the rod, the minor end of said spring engaging the support and the major end of said spring being seated in said cap.

4. A parachute comprising a canopy having a central opening therein, a downwardly facing outer dome having a marginal flange secured to the canopy about the opening, said dome including a central opening, a downwardly facing rigid, perforated inner dome axially slidably received within the outer dome for selectively opening and closing the opening in said outer dome, means urging the convex surface of the inner dome against the concave surface of the outer dome into a position for closing the opening in the outer dome, an actuating cord attached to said inner dome for moving the inner dome away from the outer dome, and a rim extending radially downwardly from said flange and being secured to said flange to provide a restricted opening for air passing upwardly into the outer dome.

5. A parachute including a canopy having a central reinforced opening, an outer dome extending upwardly from the canopy with its concave surface facing downwardly and having a marginal flange surrounding the opening, a rim extending radially inwardly and downwardly from the flange and having a peripheral upper flanged portion, the edges defining said opening being secured between said flange and said flanged portion, a support extending diametrically across the rim and dome and having ends secured to said flange and said flanged portion, said outer dome having a central opening therein considerably smaller than the opening in said canopy, and an inner downwardly facing perforated dome slidably carried by the support and disposed within said outer dome for selectively opening and closing the opening in said dome, the convex surface of said inner dome contacting the concave surface of said outer dome when the opening is covered by the inner dome.

6. A parachute including a canopy having a central reinforced opening, an outer dome extending upwardly from the canopy and having a marginal flange surrounding the opening, a rim extending radially inwardly and downwardly from the flange and having a peripheral upper flanged portion, the edges defining said opening being secured between said flange and said flanged portion, a support extending diametrically across the rim and dome and having ends secured to said flange and said flanged portion, said outer dome having a central opening therein considerably smaller than the opening in said canopy, and means slidably carried by the support and disposed within said outer dome for selectively opening and closing the opening in said dome, said means including a vertical rod slidably mounted on said support, an inner perforated dome secured to the rod and movable against the outer dome, means urging the inner dome to a position for closing the opening in the outer dome, and a pull cord attached to said rod for moving the rod and inner dome away from the outer dome.

7. The combination of claim 6 wherein said rod is tubular, said cord extending completely through said rod, and a wedge attached to the upper end of said cord and fitted in the upper end of said rod.

8. The combination of claim 7 and a cap mounted on said rod and held against the concave surface of said inner dome, said urging means comprising a conical spring embracing the rod and having its minor end seated against the support and its major end seated in said cap.

9. A parachute comprising a canopy having a central opening therein, an outer dome having a marginal flange secured to the canopy about the opening, said dome including a central opening, an inner dome for selectively opening and closing the opening in said outer dome, a diametrical support extending across the outer dome and having ends secured to said flange, a rod slidably supported by said support and secured to the inner dome, spring means between the support and the inner dome urging the inner dome against the outer dome and to a position closing the opening in the outer dome, a cord attached to said rod for sliding the same against action of said spring, and means mounted on said outer dome supporting said rod, said rod supporting means mounted on said outer dome comprising inner and outer concentric wire ring members connected together, said outer wire member having circumferentially spaced depressions, a bar supported by the inner member, said rod being hollow and receiving the bar therein, and bracket arms secured to the outer dome and having terminal loops embracing said depressions.

PETER W. ZBOCK.
FRANK ZBOCK.

References Cited in the file of this patent

UNITED STATES PATENTS

| Number | Name | Date |
| --- | --- | --- |
| 1,289,703 | Dutton | Dec. 31, 1918 |
| 1,475,304 | Kraft | Nov. 27, 1923 |
| 1,522,715 | Durr | Jan. 13, 1925 |
| 1,535,405 | Ernst | Apr. 28, 1925 |
| 2,181,611 | Shaffer | Nov. 28, 1939 |
| 2,490,232 | Rozas | Dec. 6, 1949 |

FOREIGN PATENTS

| Number | Country | Date |
| --- | --- | --- |
| 224,522 | Germany | July 21, 1910 |
| 449,478 | Italy | June 18, 1949 |